United States Patent [19]

Hightower

[11] 4,194,754
[45] Mar. 25, 1980

[54] FOLDING STEP FOR PICKUP TRUCKS

[76] Inventor: Roger W. Hightower, 1224 Northside Dr., Prescott, Ariz. 86301

[21] Appl. No.: 926,826

[22] Filed: Jul. 21, 1978

[51] Int. Cl.$^2$ ............................................. B60R 3/02
[52] U.S. Cl. .................................................. 280/166
[58] Field of Search ................... 280/166, 163, 164 R; 105/447; 182/91

[56] References Cited

U.S. PATENT DOCUMENTS

| 2,142,949 | 1/1939 | Linker | 105/447 |
| 3,394,947 | 7/1968 | Strube | 280/166 |
| 3,580,613 | 5/1971 | Northrup | 280/166 |
| 3,807,757 | 4/1974 | Carpenter et al. | 280/166 |
| 3,876,230 | 4/1975 | Phillips | 280/166 |
| 4,108,457 | 8/1978 | Garrett | 280/166 |

*Primary Examiner*—David M. Mitchell
*Attorney, Agent, or Firm*—Warren F. B. Lindsley

[57] ABSTRACT

An auxiliary foldable step for pickup trucks and the like which can be secured to the bumper of the truck with the weight of the step supported thereby and folded up when closed against the tailgate of the truck.

1 Claim, 6 Drawing Figures

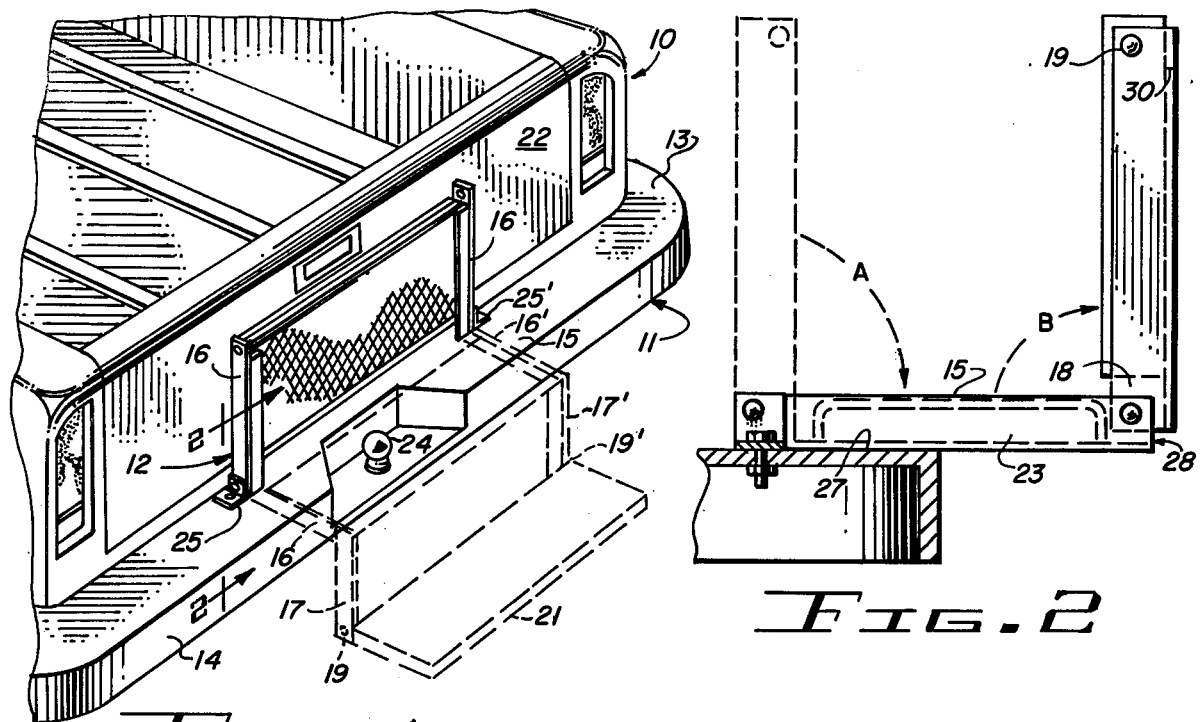
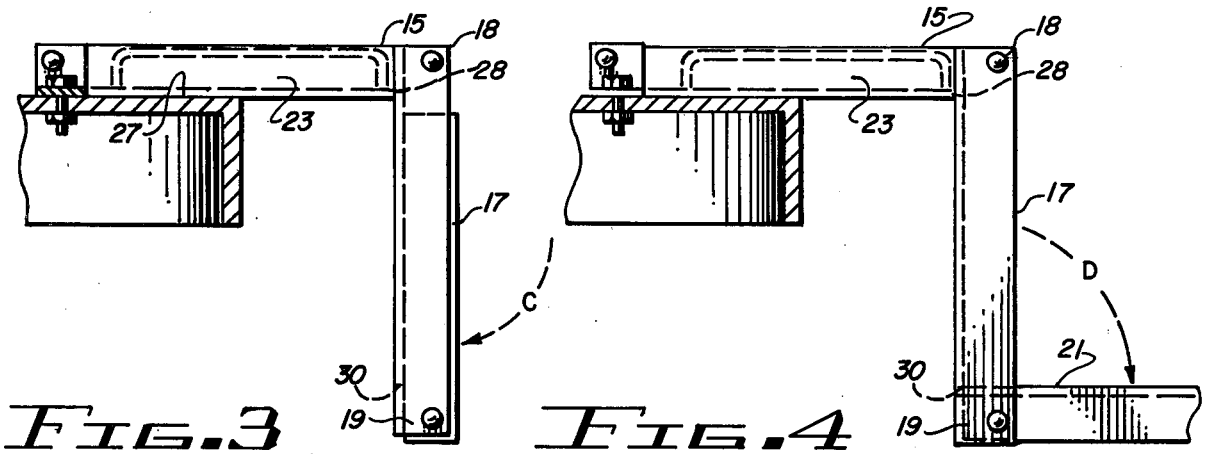
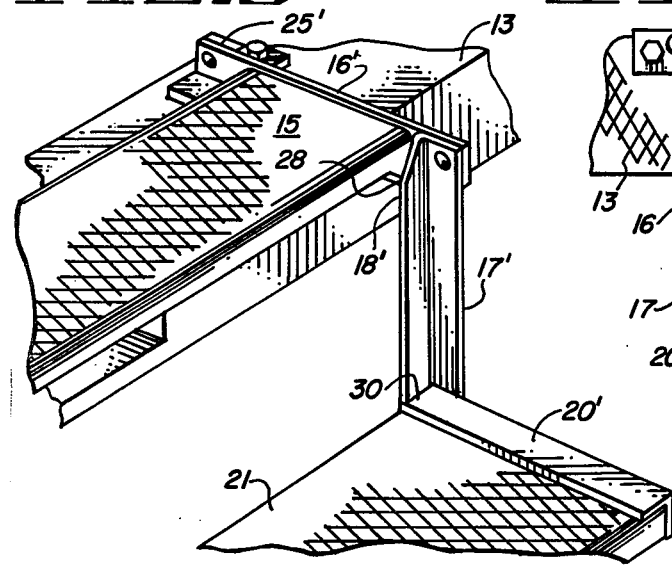
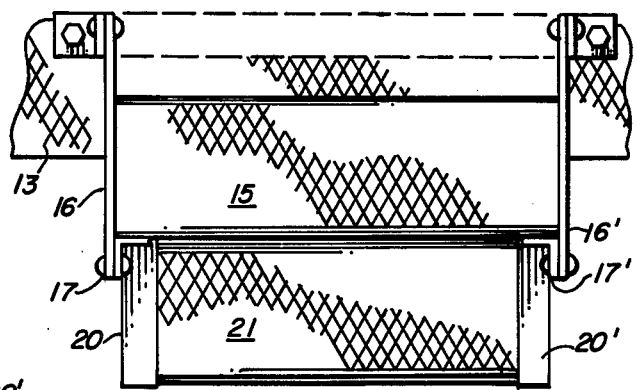

FOLDING STEP FOR PICKUP TRUCKS

BACKGROUND OF THE INVENTION

This invention relates to foldable auxiliary step structures for pickup trucks or the like which are adapted to be supported when extended by and on the flat top surface of the bumper and when folded up nestles against the tailgate of the truck.

DESCRIPTION OF THE PRIOR ART

A variety of auxiliary foldable steps are disclosed in the prior art with U.S. Pat. No. 3,865,399 disclosing an auxiliary foldable step structure for pickup trucks employing a hinge mounted to a support plate secured to the tailgate of the pickup truck.

U.S. Pat. No. 3,462,170 discloses a collapsible step for attachment to the swingable gate of a pickup truck with the horizontally disposed tailgate defining an extension of the upper tread of the step construction.

U.S. Pat. No. 3,606,382 discloses a folding step for a truck tailgate that is linked to the tailgate so that when the tailgate is lowered the steps unfold and when the tailgate is raised the steps fold up flush with the outer surface of the tailgate.

U.S. Pat. No. 3,392,990 discloses a step structure for campers which is permanently extended but pivotally mounted so that it can pivot to a position against the exterior door surface of the camper when not in use and move to a usable position when pivoted to rest with one end on the ground.

U.S. Pat. No. 3,330,577 discloses a foldable and demountable rear step assembly for vehicles which is hingedly mounted on the rear bumper of the vehicle with the top tread of the step extending outwardly therefrom.

SUMMARY OF THE INVENTION

In accordance with the invention claimed, an improved auxiliary folding step is provided for pickup trucks and the like having housing compartments mounted thereon which step is rigidly supported by the top surface of the bumper of the vehicle.

It is, therefore, one object of this invention to provide an improved foldable step for pickup trucks and the like wherein the top step tread is supported by the flat top surface of the rear bumper of the truck.

Another object of this invention is to provide an improved foldable step for a pickup truck wherein the top tread of the step when extended lies flat on the top surface of the bumper and when the step is folded up it is nested against the tailgate of the truck.

A further object of this invention is to provide an improved foldable step for pickup trucks wherein the treads of the steps fold into the edge framework of the step to provide a compact assembly when in its collapsed position.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a partial perspective view of a pickup truck with the foldable step shown in full lines in a nested position against the tailgate of the truck and in dash line position in its extended position and embodying the invention;

FIG. 2 is a cross-sectional view of FIG. 1 taken along the line 2—2 showing the step in the first two sequences of a step extending operation;

FIG. 3 is a further action in the unfolding or extending operation of the step;

FIG. 4 is an illustration of the step in its extended position;

FIG. 5 is an enlarged partial perspective view of the step in its extended position showing two of the stops for supporting the treads of the steps in a vertical position against the bumper of the truck; and FIG. 6 is a top view of the extended step.

DESCRIPTION OF THE PREFERRED EMBODIMENT

Referring more particularly to the drawing by characters of reference, FIG. 1 discloses a partial perspective view of a conventional "camper" vehicle or pickup truck 10 on the rear bumper 11 of which an auxiliary foldable step assembly 12 is mounted. As shown, the rear bumper 11 is provided with a horizontal top plate 13 and the customary integral rear flange 14 extending downwardly therefrom.

The step assembly 12 as shown in FIGS. 1–6 comprises a top plate or step tread 15 the ends of which are provided with right angle frame members or flanges 16, 16'. Downwardly extending right angles support brackets 17, 17' are pivotally mounted at their common ends 18, 18' to the frame flanges 16, 16' of step tread 15 and at their other ends 19, 19' to right angle end members of flanges 20, 20' of a bottom plate or step tread 21. The end flanges of the step treads 15 and 21 together with the support brackets 17, 17' not only provide rigidly for each step of the assembly without excessive weight or use of metal but also form a nested arrangement for the step treads when they are positioned against the tailgate 22 of the vehicle, as shown in full lines in FIG. 1 of the drawing.

The top tread 15 may be provided with a suitable notch 23 in its lower surface which will lie over the hitch ball 24 of a trailer hitch assembly in case the ball extends upwardly beyond the top surface of the top plate 13 of bumper 11.

It should be noted that one of the important features of this invention comprises the hinged mounting by clamps 25, 25' of the top step tread 15 of the assembly on the top surface 13 of bumper 11 closely adjacent or juxtapositioned to tailgate 22. Thus, when the step assembly is pivotally moved to the dash line position shown in FIG. 1 the top step tread 15 comes to rest in a coplanar arrangement on a substantial part of the width of the top surface 13 of bumper 11. This arrangement not only provides adequate support for the step assembly but the needed rigidity to satisfy the user of his or her safety. Further, since the end flanges 16, 16' of the top step tread 15 comprise right angle channel members each having one of their flat surfaces lying directly on top of the top surface 13 of the bumper, the material of top step tread may be aluminum or any other light weight material to greatly reduce the overall weight of the step assembly.

As noted from FIGS. 2–6 of the drawing, the combination of the step tread 15 and its end flanges 16, 16' is slightly longer than the combination of the step tread 21 and its end flanges 20, 20' so that the latter assembly can fold up into the border flanges 17, 17' and then the border flanges on the step tread 21 assembly pivotally move adjacent to and nestle within the step tread 15 and its end flange 16, 16'.

FIGS. 2-6 further disclose an important feature in rendering the step assembly sturdy. This feature comprises three separate stops for each of the portions of the step assembly. The first stop 27 for step tread 15 comprises the flat top surface of top plate 13 of bumper 11. This bumper surface not only supports the end flanges 16, 16' and the step tread 15 but the complete assembly. The second stop 28 comprises the edge of the ends of flanges 16, 16'. As noted in FIGS. 2, 3 and 4 when the step assembly is unfolded to the position shown in FIGS. 3 and 4, sequentially in the direction of the arrows A, B and C the upper ends 18—18 of the border flanges 17, 17' bear against the end edges of flanges 16, 16' which support firmly the border flanges in a vertical position.

The further and final unfolding of step tread 21 shown by the arrow D causes the ends of end flanges 20, 20' to butt up against the ends 19, 19' of border flanges 17, 17' to form a further stop 30 to support and brace the step tread 21 against the pivotal movement about stop 30.

Thus, a solid, sturdy step assembly supported by the top surface of the bumper is provided which has built into it three stop surfaces which tie the components of the step assembly into a unitary structure when unfolded to its weight bearing position.

Although but one embodiment of the present invention has been illustrated and described, it will be apparent to those skilled in the art that various changes and modifications may be made therein with regard to form, details, arrangements and proportions without departing from the spirit of the invention or from the scope of the appended claims.

What is claimed is:

1. A foldable step assembly for use on a pickup truck equipped with a vertically positioned tailgate and a rear bumper arranged outwardly of said tailgate and having a flat top surface comprising:
   a substantially flat top step formed of aluminum,
   a first pair of right angle members having a common side of each member secured to the underside of said top step,
   means for pivotally mounting common ends of said first pair of right angle members to the top surface of the rear bumper of a pickup truck at spaced points juxtapositioned to its tailgate so that said common side of each of said first pair of right angle members lies across substantially the width of the top surface of said bumper,
   a pair of right angle support brackets each pivotally mounted at common ends one to each of the other ends of said first pair of right angle members,
   said other ends of said first pair of right angle members being provided with a first pair of edges perpendicularly arranged to the pivotal movement of said support brackets and forming a first stop for limiting the pivotal movement of said support brackets in a direction toward said top step,
   a substantially flat bottom step formed of aluminum,
   a second pair of right angle members having a common side of each member secured to the top surface of said bottom step,
   means for pivotally connecting common ends of said second pair of right angle members one to each of the free ends of support brackets,
   a common surface of said support brackets forming a second stop for limiting the pivotal movement of said second pair of right angle members about the free ends of said support brackets when said bottom step reaches substantially a horizontal position,
   the underside of said top step being notched to receive the top of a ball hitch mounted on the bumper.

* * * * *